United States Patent
Johnson et al.

(10) Patent No.: US 7,446,672 B2
(45) Date of Patent: Nov. 4, 2008

(54) METHOD AND APPARATUS FOR COUPLING A METER REGISTER TO AN AUTOMATIC METER READING COMMUNICATION DEVICE

(75) Inventors: Rex A. Johnson, Uniontown, PA (US); Derek B. Laverdiere, Uniontown, PA (US)

(73) Assignee: M&FC Holding, LLC, Wilmington, DE (US)

( * ) Notice: Subject to any disclaimer, the term of this patent is extended or adjusted under 35 U.S.C. 154(b) by 785 days.

(21) Appl. No.: 11/089,303

(22) Filed: Mar. 24, 2005

(65) Prior Publication Data

US 2006/0218104 A1  Sep. 28, 2006

(51) Int. Cl.
  *G08B 23/00* (2006.01)
(52) U.S. Cl. .................... 340/870.02; 343/719; 439/277
(58) Field of Classification Search ............ 340/870.02, 340/870.03; 343/719; 705/412; 439/277; 324/156, 157
See application file for complete search history.

(56) References Cited

U.S. PATENT DOCUMENTS

| | | | |
|---|---|---|---|
| 4,463,354 A | 7/1984 | Sears | |
| 5,252,967 A | 10/1993 | Brennan et al. | |
| 5,416,475 A * | 5/1995 | Tolbert et al. | 340/870.02 |
| 5,659,300 A | 8/1997 | Dresselhuys et al. | |
| 6,177,883 B1 | 1/2001 | Jennetti et al. | |
| 6,369,769 B1 | 4/2002 | Nap et al. | |
| 6,378,817 B1 * | 4/2002 | Bublitz et al. | 248/200 |
| 6,414,605 B1 | 7/2002 | Walden et al. | |
| 6,617,976 B2 | 9/2003 | Walden et al. | |
| 7,033,193 B2 * | 4/2006 | Higgins et al. | 439/277 |
| 2003/0034900 A1 | 2/2003 | Han | |
| 2007/0296607 A1 * | 12/2007 | Salser, Jr. | 340/870.02 |

FOREIGN PATENT DOCUMENTS

EP 0252184 A1 1/1988

OTHER PUBLICATIONS

*RadioRead®; Meter Transceiver Unit (MXU); Model 505C*; Sensus Metering Systems; AMR System; AMR-303-R3.
*Advanced Meter Reading Technology for Utilities; "Sensing the Future with Advanced Automatic Meter Reading Technology for Utilities"*; Sensus Metering Systems; TouchRead AMR; AMR-TR04-R1.
*Sensus RadioRead® Meter Transceiver Unit (MXU); Model 505C*; Sensus Metering Systems; Installation Instructions; AMR-970-R7.

* cited by examiner

*Primary Examiner*—Timothy Edwards, Jr.
(74) *Attorney, Agent, or Firm*—Andrus, Sceales, Starke & Sawall, LLP

(57) ABSTRACT

A method and apparatus for coupling a meter register to a communication device such that output data signals from the meter register can be transmitted to a remote location. The coupling arrangement includes a data transfer wire that is connected to the meter register and is inductively coupled to the communication device such that the data transfer wire does not need to be conductively connected to the communication device. During installation of the communication device, the inductive coupling between the data transfer wire and the communication device eliminates the requirement of a conductive connection.

18 Claims, 3 Drawing Sheets

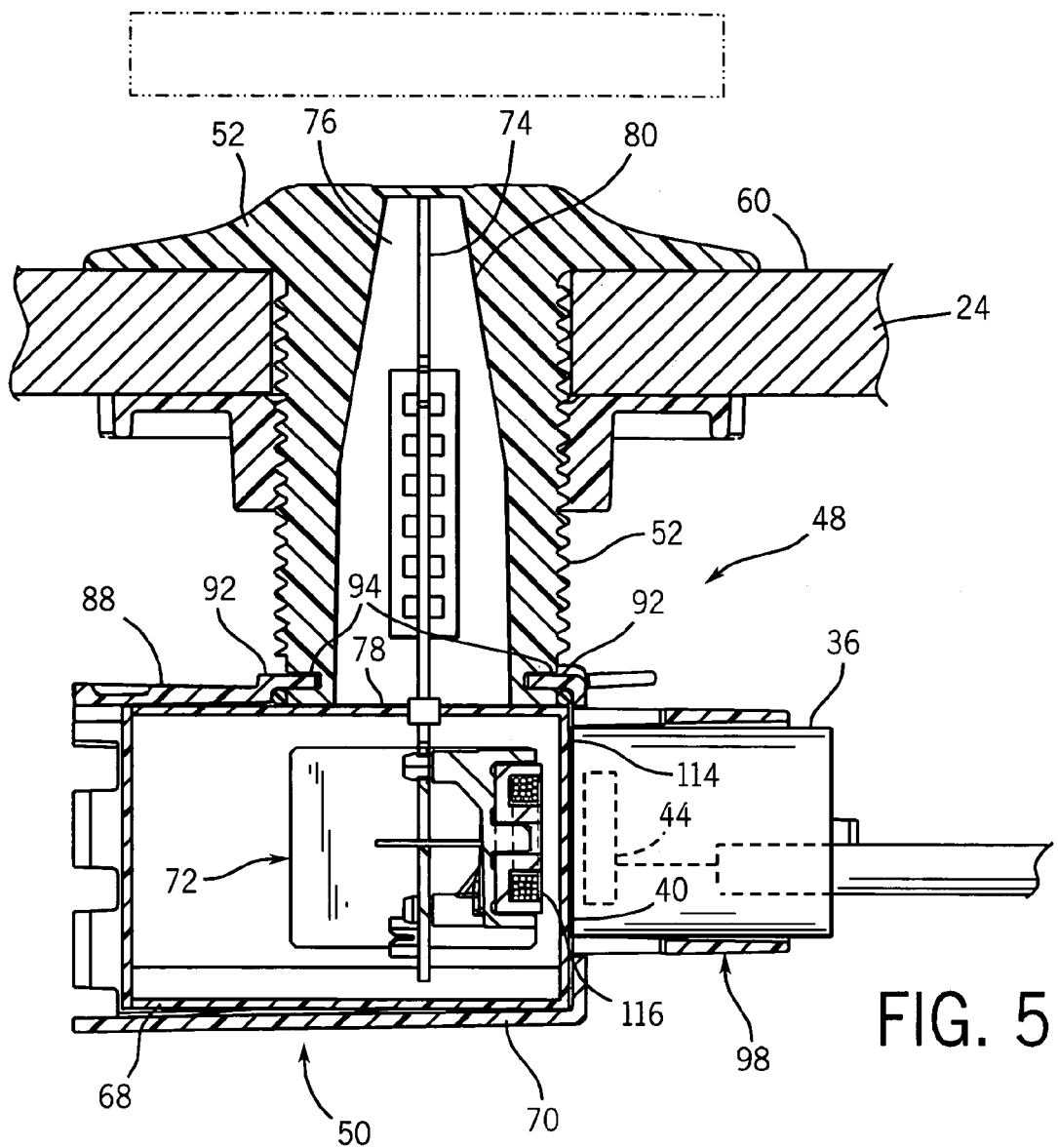
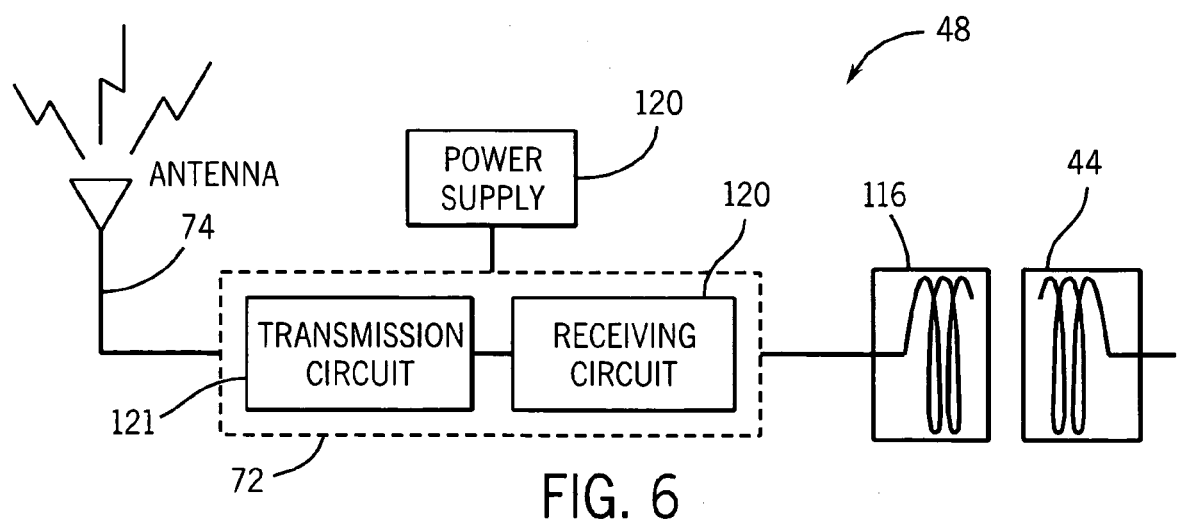
FIG. 5
FIG. 6

METHOD AND APPARATUS FOR COUPLING A METER REGISTER TO AN AUTOMATIC METER READING COMMUNICATION DEVICE

BACKGROUND OF THE INVENTION

The present invention generally relates to the automatic reading of utility meters. More specifically, the present invention is related to a method and apparatus for coupling a meter register to an automatic meter reading communication device without any wired connections.

A long standing problem in the utility industry is the economic reading of the utility meters without inconvenience to the homeowner. The problem is especially acute in connection with the reading of water meters. In geographic areas that are subject to freezing temperatures, it has in the past been necessary to install the meters within the residence to prevent damage to meter when the temperature drops such that the water within the meter freezes. However, the reading of such meter installations presents a number of problems, such as the inconvenience to the homeowner as well as the inconvenience to the meter reader when the homeowner is not present at the time of the individual meter reading.

In addition, manual meter reading has a significant disadvantage in that it requires a large amount of manpower, leading to significant expense. Further, meter readers may erroneously record the numeral values of the meter register or the homeowner may not be present at the time the meter reading is to take place.

One solution to these problems in the past was to provide a remote register that is located outside of the residence, preferably on the exterior walls of the residence. The register is typically electrically connected to the device on the meter within the resident that provides pulses or other electrical signal representative of the volumetric flow of the water through the meter. Although this system addresses the problem of inconvenience to the homeowner, the solution still requires the manual reading of the meter on a periodic basis.

In order to solve the personnel requirements of physical meter reading, a large number of remote meter reading units have been developed. These meter reading units may be, for example, an automatic meter reading (AMR) unit. The meter register comprises a sensor to detect the rotational movement of components within the meter to generate an electronic count of the volume of commodity that flows through the meter. The recorded data from the meter is broadcast by a communication device of the AMR unit using an RF signal. In such types of systems, the meter measurement is broadcast from the communication device using an RF signal that can be read from a remote location. In these remote meter reading systems, the antenna of the communication device typically extends slightly above a pit lid such that the radio frequency signals generated by the antenna can be transmitted away from the meter pit. In many situations, the pit lid is formed from a metallic material, such as iron, that significantly inhibits the transmission of radio frequency signals therethrough.

In current AMR applications being developed, a radio transmission circuit including an antenna is used to transmit meter-related information over a relatively long distance, such as up to one-half mile. The use of an AMR radio to transmit meter-related information over a relatively long distance allows the meter data to be read from a remote location and eliminates the requirement of a meter reader physically interrogating the meter from a location proximate to the meter. Such an AMR system is able to transmit meter-related information from the meter to a remote location, such as a gateway node, located within the neighborhood of the meter to be read. This type of remote meter reading dramatically reduces the amount of manpower required to obtain meter readings.

In a typical installation of an AMR communication device, which often times includes an RF transmitter, the communication device is connected to the meter register through a three wire connection. The three wire connection requires the physical interconnection between the communication device and the meter register. Typically, the wire connections are made by a service technician during initial installation by using a gel-cap splicing kit to ensure a weather tight and secure electrical connection between the wires from the meter register and the communication device. Although the gel-cap electrical connection between the communication device and the meter housing functions adequately once installed, the electrical connection requires service personnel to take additional steps when installing a meter or when retrofitting an existing meter with the communication device.

Therefore, a need exists for an improved method of transmitting information from the meter register to the communication device that eliminates the conductive connections required in most field installations. Further, a need exists for a dependable and secure connection between the communication device and the meter register that can be completed in the field with minimal time requirements and ensures a proper connection. Further, a need exists for a communication device that can be installed quickly and easily with existing, installed meter registers.

SUMMARY OF THE INVENTION

The present invention relates to a unique coupling between an electronic meter register and a communication device such that output data signals from the electronic meter register can be received by the communication device and the relevant consumption data from the meter can be transmitted using radio frequency transmission. The signal coupling between the electronic meter register and the communication device is completed without any conductive connection and utilizes inductive coupling between a pair of inductive coils.

The communication device is positioned at a location remote from the electronic meter register. Typically, the communication device of the present invention is suspended beneath the pit lid that covers a pit enclosing the utility meter including the electronic meter register. The communication device includes electronic circuitry, an internal power supply and an antenna within an environmentally protected inner enclosure. The sealed enclosure of the communication device includes a front wall, behind which is positioned at least one inductive coil. The inductive coil positioned behind the front wall of the inner enclosure is electrically coupled to the electronic circuitry of the communication device. Preferably, the communication device includes more than one inductive coil such that the communication device can be used to receive output data signals from more than one electronic meter register.

The sealed inner enclosure of the communication device is surrounded by an outer mounting shell that includes multiple attachment openings, each of which can receive a receptacle port. Preferably, each of the attachment openings are aligned with one of the inductive coils included within the inner enclosure of the communication device.

The receptacle ports can be selectively positioned on the outer shell of communication device depending upon the number of electronic meter registers utilized with the single communication device. In each case, the receptacle port is generally aligned with one of the inductive coils within the sealed inner enclosure. The receptacle ports include an inner cylindrical cavity and include a pair of flexible fingers used to secure a connector module within the receptacle port.

The electronic meter register includes a data transfer wire that is conductively connected to the electric meter register at a first end prior to installation of the electronic register. The second end of the data transfer wire includes a connector module having an outer enclosure surrounding an inductive coil. The connector module preferably has a cylindrical outer wall and includes a potting material that seals the inductive coil within the connector module. The connector module includes a front face surface, behind which is positioned the inductive coil.

The connector module of the data transfer wire is sized to be securely retained within the receptacle port formed on the communication device. When the connector module is received and retained within the receptacle port, the first inductive coil of the connector module is spaced from the second inductive coil included in the communication device and generally aligned with the receptacle port. However, the proximity between the first inductive coil and the second inductive coil is sufficient to permit signals present at either coil to be received through an inductive coupling at the other inductive coil. In this manner, the signal connection between the electric meter register and the communication device can be completed through inductive coupling without the requirement of any conductive connection. In addition to the signal transfer between the inductive coils, power can be transferred from the communication device to the meter register through the inductive coupling.

Once the output data signal is received at the second inductive coil in the communication device, the electronic circuitry contained within the communication device generates an RF signal including the selected portions of the consumption data from the meter register. The RF signal including the relevant consumption data can be transmitted by the antenna included within the communication device.

BRIEF DESCRIPTION OF THE DRAWINGS

The drawings illustrate the best mode presently contemplated for carrying out the invention. In the drawings:

FIG. 5 is a section view taken along line 5-5 of FIG. 3; and

FIG. 6 is a schematic illustration of the electronic circuitry contained within the communication device of the present invention.

DETAILED DESCRIPTION OF THE PREFERRED EMBODIMENT

Figure 1:
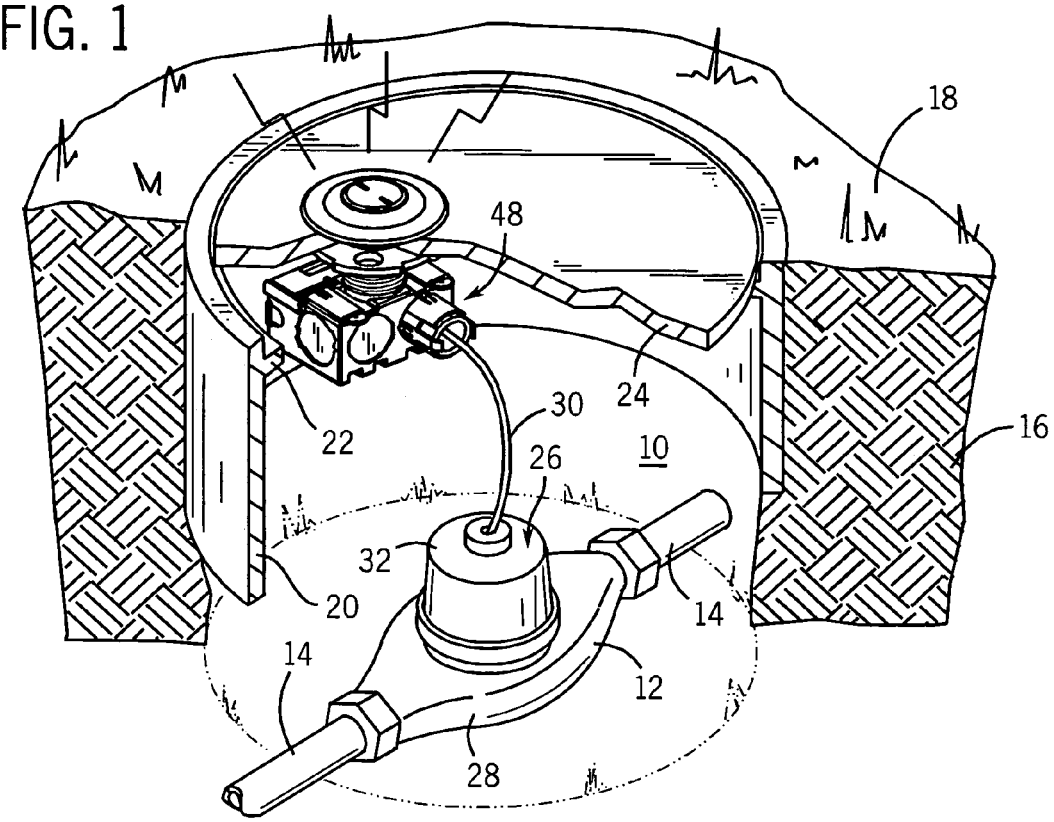
FIG. 1 is a partial sectional, perspective view of a utility meter including an electronic meter register coupled to the communication device mounted to the pit lid.

Referring first to FIG. 1, thereshow is a meter pit 10 that includes a utility meter 12. In the embodiment of the invention illustrated, the utility meter 12 is a water meter that is positioned in a water supply line 14 buried within the ground 16 and extending through the meter pit 10. Although the utility meter 12 will be described throughout the following description as being a water meter, it should be understood that the utility meter could be any of a variety of different types of meters for measuring different types of consumable commodities, such as gas, water, electricity or any other type of commodity.

As illustrated in FIG. 1, the meter pit 10 extends below the ground surface 18 and is defined by a pit box 20. The pit box 20 is a cylindrical, metal enclosure that is submerged in the ground 16. The pit box 20 includes an upper ledge 22 that supports a pit lid 24. In the embodiment of the invention illustrated, the pit lit 24 is preferably formed from a metallic material, such as cast iron. The pit lid 24 encloses the meter pit 10.

The utility meter 12 includes a meter register 26 that is mounted to the meter body 28. Preferably, the meter register 26 is an electronic meter register that includes internal circuitry that monitors the rotational movement of components contained within the meter body 28. The electronic meter register is a common commercial component that detects the rotational movement of components within the meter body 28 and generates an electronic count of the volume of commodity that flows through the meter 12. The electronic meter register 26 records the volumetric flow information received from the meter body 28 in a conventional manner. An example of an electronic meter register is the Sensus ICE meter register.

As illustrated in FIG. 1, the electronic meter register 26 includes a data transfer wire 30 that extends through the top wall 32 of the meter register 26. The first end of the data transfer wire 30 is conductively connected at the manufacturing facility to the internal circuitry of the electronic meter register 26. The electronic meter register 26, including the data transfer wire 30, are conventional components and are currently in use in automatic meter reading units, such as the Sensus Radio Read® meter transceiver unit (MXU). In the prior art systems, such as the Sensus Radio Read® MXU, the second end of the data transfer wire 30 is conductively connected to an external communication through the use of physical wire connections that are secured using gel caps. As discussed previously, this type of physical interconnection between the data transfer wire 30 and a communication device requires the use of gel caps and manual interconnection to the MXU.

Figure 2:
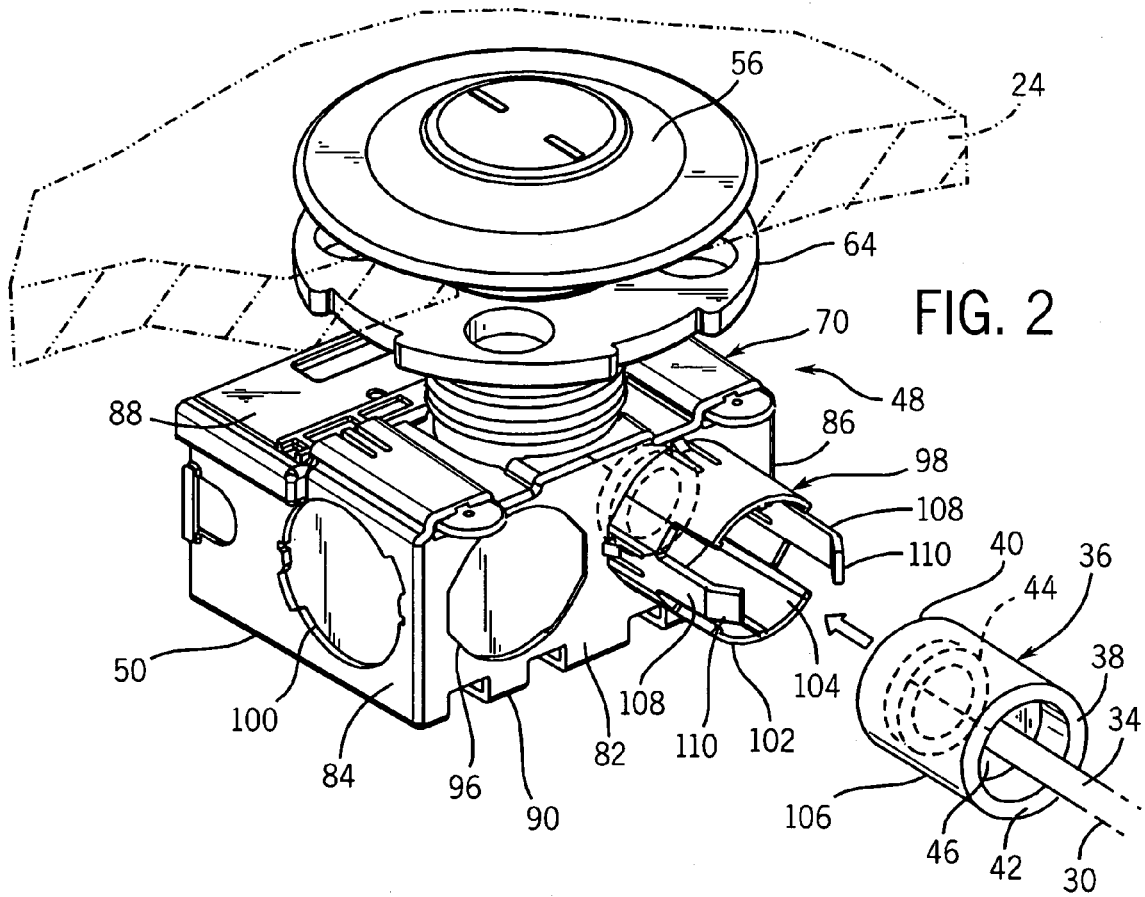
FIG. 2 is a perspective view illustrating the coupling between the communication device and the connector module of the data transfer wire.

Referring now to FIG. 2, thereshown is the second end 34 of the data transfer wire 30. The second end 34 includes a connector module 36. The connector module 36 preferably includes a cylindrical outer wall 38 formed from a molded plastic material. The outer wall 38 is integrally molded with and extends from a front face surface 40 to a back surface 42. The second end 34 of the data transfer wire 30 extends into the open interior defined by the outer wall 38 and is connected to a first inductive coil 44. The inductive coil 44 is centered within the cylindrical open interior defined by the outer wall 38 and is spaced inwardly from the front face surface 40, as can best be seen in FIG. 4. The inductive coil 44 is electrically connected to the second end 34 of the data transfer wire 30 such that an output data signal generated by the electronic meter register is present at the inductive coil 44.

The connector module 36 includes a sealing or potting material 46 (FIG. 2) that surrounds the inductive coil 44 to prevent water from contacting the inductive coil 44. The data transfer wire 30 includes an outer, waterproof sheath that prevents water from contacting the electric wires contained within the data transfer wire 30.

Referring back to FIG. 2, thereshown is a communication device 48 of the present invention. The communication device 48 includes internal circuitry, as will be described in greater detail below, that receives an output data signal from the electronic meter register 26 that includes consumption data for the meter. The internal circuitry extracts to relevant consumption data and broadcasts a signal by radio frequency for reception and reading at a remote location. The communication device 48 is supported beneath the pit lid 24 and electronically coupled to the electronic meter register 26 through the data transfer wire 30. The communication device 48 includes a main enclosure body 50 suspended beneath the pit lid 24.

Figure 3:
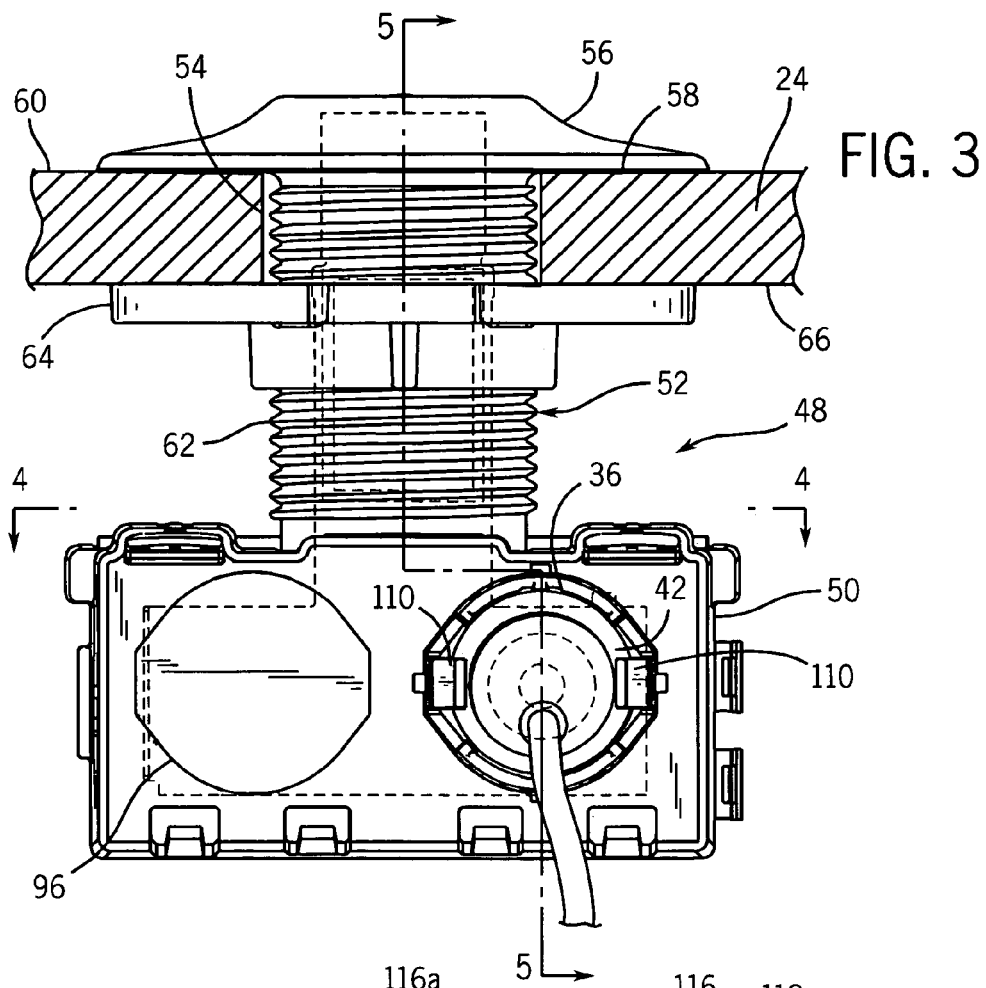
FIG. 3 is a front view illustrating the data transfer wire secured to the communication device.

Referring now to FIG. 3, the communication device 48 includes an upper housing 52 that extends through an opening 54 formed in the pit lid 24. Specifically, the upper housing 52 includes a mushroom shaped top cap 56 having an outer diameter greater than the diameter of the opening 54. A bottom surface 58 of the top cap 56 contacts the top surface 60 of the pit lid 24. The upper housing 52 includes an externally threaded body 62 that extends through the opening 54 and is securely attached to the main enclosure body 50. A locking nut 64 is threadedly received along the body 62 and is tightened into contact with the bottom surface 66 of the pit lid 24. The threaded movement of the locking nut 64 into contact with the bottom surface 66 prevents the upper housing 52 from being removed from the opening 54.

Referring now to FIG. 5, the main enclosure body 50 generally includes a sealed inner enclosure 68 that is surrounded by an outer shell or boot 70. The inner enclosure 68 is a general rectangular member that completely encloses the electronic circuitry 72 of the communication device 48. The inner enclosure 68 includes an opening that allows an antenna 74 to be connected to the electronic circuitry 72. The antenna 74 is encapsulated in a protective block 76 that rests on the top wall 78 of the inner enclosure 68. The protective block 76 is preferably formed from UHMW plastic and received within the corresponding central opening 80 formed in the upper housing 52. The protective block 76 provides a water tight enclosure surrounding the antenna 74. The combination of the protective block 76 and the inner enclosure 68 provides a water resistant environment for the electronic circuitry 72 and antenna 74 of the communication device 48.

Referring back to FIG. 2, the outer shell 70 includes a front face surface 82, a pair of side surfaces 84, 86, a top surface 88, a bottom surface 90 and an open back. As illustrated in FIG. 5, the top surface 88 includes a pair of projecting flanges 92 that engage a corresponding pair of grooves 94 in the upper housing 52 to support the main enclosure body 50.

Referring back to FIG. 2, the front face surface 82 of the outer shell 70 includes a pair of receptacle attachment openings 96. In the embodiment shown in FIG. 2, one of the attachment openings 96 is shown including a receptacle port 98 securely mounted in front of the attachment opening 96. The receptacle port 98 can be selectively removed from the front face surface 82 and attached to the other attachment opening 96. The shell 70 further includes a side opening 100 that is aligned with a programming port of the communication device.

Figure 4:
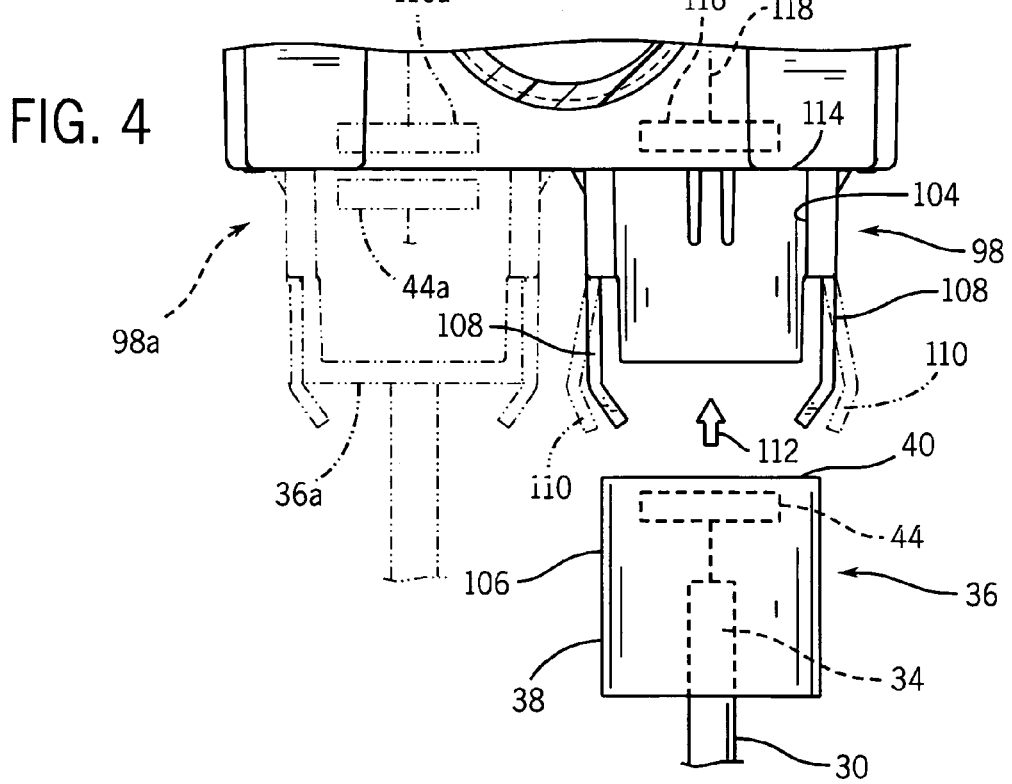
FIG. 4 is a top view taken along line 4-4 of FIG. 3 showing the removable connection of the connector module to the communication device.

As best illustrated in FIGS. 2 and 4, the receptacle port 98 is defined by a cylindrical outer wall having an inner surface 104 defining a cylindrical open interior. The open interior of the receptacle port 98 is sized slightly larger than the outer surface 106 of the connector module 36. The receptacle port 98 includes a pair of opposed flexible fingers 108 each having an inwardly extending outer end 110. As illustrated in FIG. 4, each of the flexible fingers 108 can flex outwardly such that the outer ends 110 are separated by a distance greater than the outer diameter of the connector module 36. As the connector module 36 is moved inwardly as illustrated by arrow 112, the front face surface 40 contacts a back wall 114. The back wall 114 generally corresponds to the outer surface of the inner enclosure. Once the connector module 36 is received within the receptacle port 98, the flexible fingers 108 return to their normal position such that the outer ends 110 engage the back surface 42 of the connector module 36, as best illustrated in FIG. 3. The interaction between the flexible fingers 108 and the back surface of the connector module 36 retains the connector module 36 within the receptacle port 98, as illustrated.

As shown in FIG. 4, a second receptacle module 98a can be positioned adjacent to the receptacle module 98 as shown. Thus, the communication device 48 can be configured to receive more than one connector module 36, and thus coupled to more than one data transfer wire 30.

Referring now to FIGS. 4 and 5, the electronic circuitry 72 contained within the communication device 48 includes a second inductive coil 116. The second inductive coil 116 is connected by a wire 118 to the electronic circuitry 72. As illustrated in FIG. 5, the second conductive coil 116 is aligned with the first inductive coil 44 when the connector module 36 is received in the receptacle port 98. The first and second inductive coils 44 and 116 are aligned such that a signal present at the first inductive coil 44 is transferred to the second inductive coil 116 by inductive coupling. Likewise, a signal present at the second inductive coil 116 can be transferred to the first inductive coil 44. Thus, a signal can be transmitted from the first inductive coil 44 through the front face surface 40 of the connector module 36, through the back wall 114 of the inner enclosure and received by the second inductive coil 116. In this manner, a signal present on the data transfer wire 30 can be transferred to the electronic circuitry 72 without a conductive connection between the data transfer wire and the electronic circuitry.

Referring now to FIG. 4, another inductive coil 116a can also be included in the communication device 48 such that the inductive coil 116a can be aligned with an inductive coil 44a of another connector module 36a.

Referring now to FIG. 6, thereshow is a schematic illustration of the internal circuitry for the communication device 48. As illustrated, the communication device 48 includes electronic circuitry 72 that includes a receiving circuit 120 that receives a digital data signal from the inductive coil 116. A transmission circuit 121 creates and transmits a RF signal including the relevant consumption data from the meter register. The electronic circuitry 72 is a conventional circuit currently in use, such as in the Sensus Radio Read® meter transceiver unit (MXU). As illustrated, the electronic circuitry 72 is powered by a power supply 120. The power supply 120 supplies the required power for the transmission circuit 121 to generate an RF signal from the antenna 74 that can be received at a remote monitoring location. In addition to supplying the power to operate the transmission circuit 121, the power supply 120 provides electric power to the meter register through the inductive coupling between the inductive coil 116 and the inductive coil 44 contained within the connector module. The power supplied through the inductive coupling to the electronic meter register allows the electronic meter register to generate the output data signal back to the communication device 48 through inductive coupling between the first inductive coil 44 and second inductive coil 116.

Referring back to FIG. 1, the operation of the system for transmitting consumption measurement data from the utility meter to a remote monitoring location will now be discussed. Initially, the meter body 28 is installed within the meter pit 10 in line with the water supply pipe 14. Once the utility meter 12 is in place, the electronic meter register 26 is installed onto the meter body 28. As described previously, the meter register 26 is a conventional component that converts mechanical movement within the meter body 28 into an electronic measurement that is stored within the electronic meter register 26. Alternatively, the meter register 26 can be integrated with the meter body 28.

As illustrated in FIG. 1, the electronic meter register 26 includes the pre-installed data transfer wire 30 that extends through the top wall 32 of the meter register 26. The data transfer wire 30 is attached at its first end to the electronic components contained within the electronic meter register 26. As illustrated in FIG. 2, the second end of the data transfer wire includes the cylindrical connector module 36 that surrounds the first inductive coil 44. When required, the electronic meter register 26 can generate an output data signal that includes the commodity consumption data to the first inductive coil 44.

As described previously, the communication device 48 is attached to the pit lid 24 by the interaction between the top cap 56 of the upper housing 52 and the locking nut 64. As best shown in FIG. 5, the sealed inner enclosure 68, which includes the electronic circuitry 72 for the communication device 48, is received within the outer shell 70. The outer shell 70 engages the upper housing 52 to support the inner enclosure 68 in the position shown in FIG. 5.

As clearly illustrated in FIG. 5, the electronic circuitry 72 includes at least one inductive coil 116. The inductive coil 116 is positioned behind the back wall 114 of the inner enclosure 68. As illustrated, the inductive coil 116 is generally aligned with the first inductive coil 44 when the connector module 36 is received within the receptacle port 98. In this manner, the output data signal from the electronic meter register can be inductively transmitted from the first inductive coil 44 to the second inductive coil 116. The inductive coupling of the first inductive coil 44 and the second inductive coil 116 allows electronic signals to be transferred bi-directionally between the electronic meter register and the electronic circuitry 72 contained within the communication device 48.

Once the electronic signal is received by the electronic circuitry 72, the electronic circuitry 72 extracts the relevant consumption data and the transmission circuit transmits the relevant consumption data using the antenna 74 that extends past the top surface 60 of the pit lid 24, as illustrated in FIG. 5.

As discussed previously, the outer shell 70 includes multiple attachment openings 96 that each can selectively receive one of the receptacle ports 98, as best shown in FIGS. 2 and 4. As illustrated in FIG. 4, the electronic circuitry within the communication device 48 can be configured to have multiple internal inductive coils 116, 116a such that the communication device 48 can inductively receive information from more than one connector module 36.

Although the present invention has been described as including an inductive coupling between the data transfer wire 30, which is conductively connected to the meter register, and the communication device 48, it is contemplated by the inventors that the data transfer wire 30 could include an inductive coil contained within a connector module on both of its ends. The inductive coil and connector module on the first end of the data transfer wire would be received within a similar receptacle placed on the meter register. In this way, the consumption data from the meter register could be transferred to the data transfer wire using an inductive coupling similar to the inductive coupling shown and described between the data transfer wire and the communication device. Additionally, it is contemplated the inductive coupling between the communication device and the data transfer wire could be replaced by a conductive connection such that the inductive coupling would exist between the data transfer wire and the meter register, rather than between the data transfer wire and communication device.

As can be understood by the above description of the present embodiment of the invention, the interconnection between the electronic meter register and the communication device is created by an inductive coupling between the two devices. Specifically, a connector module on the data transfer wire of the electronic meter register is inductively coupled across the enclosure of the communication device such that the physical wiring connections can be replaced. Eliminating the physical wire connections dramatically decreases the amount of time required to create the electrical connection while at the same time reducing the complexity of such connection.

What is claimed is:

1. A system for transmitting consumption measurement data from a utility meter to a remote monitoring location, the utility meter having an electronic meter register operable to accumulate data related to the flow of a commodity through the utility meter, the accumulated data being represented by an output data signal, the system comprising:

a data transfer wire conductively connected at a first end to the electronic meter register for receiving the output data signal, a second end of the data transfer wire including a first inductive coil enclosed within a connector module; and a communication device inductively coupled to the data transfer wire for receiving the output data signal and transmitting the accumulated data to the remote monitoring location, wherein the communication device includes a receptacle port sized to receive the connector module, the receptacle port being generally aligned with a second inductive coil contained within the communication device, wherein the first inductive coil of the connector module is electrically spaced from the second inductive coil when the connector module is received in the receptacle port.

2. The system of claim 1 wherein the first inductive coil of the connector module is positioned behind a front face surface of the connector module and the second inductive coil of the communication device is positioned behind a front wall and aligned with the receptacle port, wherein the front face surface contacts the front wall when the connector module is received within the receptacle port.

3. The system of claim 2 wherein the connector module includes a cylindrical outer wall extending from the front face surface and the receptacle port includes a cylindrical inner wall defining an open interior sized to receive the connector module, wherein the cylindrical outer wall of the connector module includes at least a pair of flexible fingers that engage the connector module to retain the connector module within the receptacle port.

4. The system of claim 1 wherein the first end of the data transfer wire is electrically connected to the meter register.

5. The system of claim 1 wherein the first inductive coil is inductively coupled to the second inductive coil such that the output data signal can be transferred from the first inductive coil to the second inductive coil.

6. The system of claim 1 wherein the communication device includes a plurality of receptacle ports such that the communication device can receive a plurality of data transfer wires from a plurality of electronic meter registers.

7. The system of claim 1 wherein the receptacle port includes a pair of flexible fingers that engage the connector module to hold the connector module within the receptacle port.

8. The system of claim 1 wherein the communication device includes electronic operating circuitry and an antenna, wherein the electronic operating circuitry and the antenna are positioned within a sealed inner enclosure.

9. A system for transmitting consumption measurement data from a utility meter positioned within a subsurface pit enclosure including a pit lid to a remote monitoring location, the utility meter including an electronic meter register for accumulating data related to the flow of a commodity through the meter, the accumulated data being represented by an output data signal, the system comprising:
 at least one data transfer wire coupled at a first end to the electronic meter register for receiving the output data signal, a second end of the data transfer wire including a first inductive coil enclosed within a connector module; and
 a communication device mounted to the pit lid and inductively coupled to the data transfer wire for receiving the output data signal and transmitting the accumulated data represented by the output data signal to the remote monitoring location, wherein the communication device includes at least one receptacle port sized to receive one of the connector modules, the receptacle port being generally aligned with a second inductive coil contained within the communication device, wherein the first inductive coil of the connector module is electrically spaced from the second inductor coil when the connector module is received in the receptacle port.

10. The system of claim 9 wherein the first inductive coil of the connector module is positioned behind a front face surface of the connector module and the second inductive coil of the communication device is positioned behind a front wall of a sealed inner enclosure and aligned with the receptacle port, wherein the front face surface contacts the front wall when the connector module is received within the receptacle port.

11. The system of claim 10 wherein the connector module includes a cylindrical outer wall extending from the front face surface and the receptacle port includes a cylindrical inner wall defining an open interior sized to receive the connector module.

12. The system of claim 11 wherein the receptacle port includes at least a pair of flexible fingers that engage the connector module to hold the connector module within the receptacle port.

13. The system of claim 11 wherein the communication device includes electronic operating circuitry and an antenna, wherein the electronic operating circuitry and the antenna are positioned within a sealed inner enclosure.

14. The system of claim 9 wherein the communication device includes a plurality of receptacle ports such that the communication device can receive a plurality of data transfer wires from a plurality of electronic meter registers.

15. The system of claim 14 wherein the communication device includes a plurality of second inductive coils, each of the second inductive coils being aligned with one of the receptacle ports.

16. A method of transmitting consumption measurement data from the utility meter to a remote monitoring location, the method comprising the steps of:
 positioning an electronic meter register on a utility meter, the electronic meter register being operable to accumulate data related to the flow of a commodity through the meter, the accumulated data being represented by an output data signal, the electronic meter register including a data transfer wire extending from the electronic meter register, the data transfer wire including a first inductive coil enclosed within a connector module;
 securely mounting a communication device at a location remote from the electronic meter register, the communication device including a second inductive coil generally aligned with a receptacle port;
 receiving the connector module of the data transfer wire within the receptacle port of the communication device such that the first inductive coil of the connector module is generally aligned with the second inductive coil of the communication device; and
 inductively coupling the first inductive coil to the second inductive coil such that the output data signal present on the data transfer wire is received at the second inductive coil.

17. The method of claim 16 further comprising the step of:
 converting the output data signal into an RF signal including the accumulated data within the communication device; and
 transmitting the RF signal through an antenna included within the communication device.

18. The method of claim 16 further comprising the step of receiving a second connector module within a second receptacle port of the communication device.

* * * * *